United States Patent
Li et al.

(10) Patent No.: US 10,754,948 B2
(45) Date of Patent: Aug. 25, 2020

(54) PROTECTING DEVICES FROM MALICIOUS FILES BASED ON N-GRAM PROCESSING OF SEQUENTIAL DATA

(71) Applicant: Cylance Inc., Irvine, CA (US)

(72) Inventors: Li Li, Irvine, CA (US); Xuan Zhao, Irvine, CA (US); Sepehr Akhavan-Masouleh, Laguna Niguel, CA (US); John Hendershott Brock, Irvine, CA (US); Yaroslav Oliinyk, Portland, OR (US); Matthew Wolff, Laguna Niguel, CA (US)

(73) Assignee: Cylance Inc., Irvine, CA (US)

( * ) Notice: Subject to any disclaimer, the term of this patent is extended or adjusted under 35 U.S.C. 154(b) by 185 days.

(21) Appl. No.: 15/490,797

(22) Filed: Apr. 18, 2017

(65) Prior Publication Data
US 2018/0300482 A1 Oct. 18, 2018

(51) Int. Cl.
*G06F 21/56* (2013.01)
*G06N 20/00* (2019.01)

(52) U.S. Cl.
CPC .......... *G06F 21/565* (2013.01); *G06F 21/563* (2013.01); *G06N 20/00* (2019.01); *G06F 2221/034* (2013.01)

(58) Field of Classification Search
CPC .. G06F 21/564; G06F 2221/034; G06F 21/56; G06F 21/565; G06N 99/005
See application file for complete search history.

(56) References Cited

U.S. PATENT DOCUMENTS

| | | | |
|---|---|---|---|
| 8,099,784 B1 * | 1/2012 | Chen | G06F 21/554 726/23 |
| 8,165,414 B1 | 4/2012 | Yagnik | |
| 8,826,439 B1 * | 9/2014 | Hu | G06F 21/563 726/24 |
| 9,292,688 B2 * | 3/2016 | Avasarala | G06F 21/56 |
| 9,372,989 B2 * | 6/2016 | Grystan | G06F 21/56 |
| 9,633,653 B1 * | 4/2017 | Porter | G10L 15/063 |
| 10,007,786 B1 * | 6/2018 | Bhatkar | G06F 21/566 |

(Continued)

OTHER PUBLICATIONS

Title: "Unknown Malcode Detecting Using OPCODE Representation", Author: Moskovitch et al., EuroISI 2008, LNCS 5376, pp. 204-215, 2008. (Year: 2008).*

(Continued)

*Primary Examiner* — Linglan E Edwards
(74) *Attorney, Agent, or Firm* — Jones Day

(57) ABSTRACT

Under one aspect, a method is provided for protecting a device from a malicious file. The method can be implemented by one or more data processors forming part of at least one computing device and can include extracting from the file, by at least one data processor, sequential data comprising discrete tokens. The method also can include generating, by at least one data processor, n-grams of the discrete tokens. The method also can include generating, by at least one data processor, a vector of weights based on respective frequencies of the n-grams. The method also can include determining, by at least one data processor and based on a statistical analysis of the vector of weights, that the file is likely to be malicious. The method also can include initiating, by at least one data processor and responsive to determining that the file is likely to be malicious, a corrective action.

23 Claims, 6 Drawing Sheets

(56) References Cited

U.S. PATENT DOCUMENTS

| | | | |
|---|---|---|---|
| 10,133,865 B1* | 11/2018 | Feinman | G06F 21/56 |
| 2007/0174817 A1* | 7/2007 | Fanning | G06F 11/3612 |
| | | | 717/124 |
| 2015/0039543 A1 | 2/2015 | Athmanathan et al. | |
| 2015/0254555 A1 | 9/2015 | Williams, Jr. et al. | |
| 2016/0094564 A1* | 3/2016 | Mohandas | H04L 63/145 |
| | | | 726/24 |
| 2017/0093893 A1* | 3/2017 | Davydov | H04L 63/1416 |
| 2017/0139693 A1* | 5/2017 | Li | G06F 8/443 |
| 2018/0196943 A1* | 7/2018 | Coroiu | G06F 21/564 |
| 2018/0198800 A1* | 7/2018 | Krasser | H04L 63/145 |
| 2018/0300608 A1* | 10/2018 | Sevrens | G06N 3/0445 |

OTHER PUBLICATIONS

Siddiqui et al., "Data mining methods for malware detection using instruction sequences," Jan. 2008.

* cited by examiner

PROTECTING DEVICES FROM MALICIOUS FILES BASED ON N-GRAM PROCESSING OF SEQUENTIAL DATA

FIELD

This application relates to protecting devices from malicious files.

BACKGROUND

Different types of files can be malicious, and can be referred to as "malware." Such malicious files can include, for example, certain operating codes, or "opcodes," which can be embedded within executable files for use in operating systems such as MICROSOFT WINDOWS, APPLE MAC OS, LINUX, UNIX, ANDROID, or APPLE iOS, or within other types of files, such as MICROSOFT WORD documents or ADOBE PDFs. Malicious files can cause software errors in the operating system or other programs operating on a device, can steal financial and/or identification information of a user, and/or cause a host of other problems.

Security software has been developed for detecting malicious files. For example, when a user attempts to open or use a file, some security software can compare that file to each of a variety of known malicious files, and if a match is found indicating the file is malicious, can take corrective action, such as preventing the user from opening or using the file so as to inhibit execution of code within that file and alerting the user as to the malicious nature of the file. However, in such security software, the malicious file must be known a priori, and the file the user is attempting to open or use must exactly match the known malicious file for corrective action to be taken.

SUMMARY

Provided herein are systems, methods, and computer readable media for use in protecting devices from malicious files based on n-gram processing of sequential data.

Under one aspect, a method is provided for protecting a device from a malicious file. The method can be implemented by one or more data processors forming part of at least one computing device and can include extracting from the file, by at least one data processor, sequential data comprising discrete tokens. The method also can include generating, by at least one data processor, n-grams of the discrete tokens. The method also can include generating, by at least one data processor, a vector of weights based on respective frequencies of the n-grams. The method also can include determining, by at least one data processor and based on a statistical analysis of the vector of weights, that the file is likely to be malicious. The method also can include initiating, by at least one data processor and responsive to determining that the file is likely to be malicious, a corrective action.

Optionally, the extracted sequential data includes operation code. Optionally, the discrete tokens respectively include syllables of machine language instructions within the operation code.

Optionally, generating the vector of weights includes determining, by at least one data processor, a term frequency of each of the n-grams among the other n-grams. Optionally, generating the vector of weights further includes determining, by at least one data processor, an inverse document frequency of each of the n-grams within a corpus. Optionally, generating the vector of weights further includes generating, by at least one data processor, a dot product of the term frequency and the inverse document frequency for each of the n-grams.

Optionally, the statistical analysis of the vector of weights includes performing a logistic regression on the vector of weights. Additionally, or alternatively, the statistical analysis of the vector of weights optionally includes inputting the vector of weights to a machine learning model. Optionally, the machine learning model is selected from the group consisting of generalized linear models, ordinary least squares, ridge regression, lasso, multi-task lasso, elastic net, multi-task elastic net, least angle regression, LARS lasso, orthogonal matching pursuit, Bayesian regression, naive Bayesian, logistic regression, stochastic gradient descent, neural networks, Perceptron, passive aggressive algorithms, robustness regression, Huber regression, polynomial regression, linear and quadratic discriminant analysis, kernel ridge regression, support vector machines, stochastic gradient descent, nearest neighbor, Gaussian processes, cross-decomposition, decision trees, random forest, and ensemble methods.

Optionally, n is at least two.

Optionally, the corrective action is selected from the group consisting of quarantining the file, stopping execution of the file, notifying the user that the file likely is malicious, flagging the file, storing the file, generating a hash of the file, transmitting the file or a hash of the file, and reverting to an earlier version of the file or device software.

Under another aspect, a system is provided for protecting a device from a malicious file. The system can include a data processor and memory storing instructions which, when executed by the data processor, result in operations. The operations can include extracting from the file sequential data including discrete tokens. The operations also can include generating n-grams of the discrete tokens. The operations also can include generating a vector of weights based on respective frequencies of the n-grams. The operations also can include, based on a statistical analysis of the vector of weights, determining that the file is likely to be malicious. The operations also can include initiating, responsive to determining that the file is likely to be malicious, a corrective action.

Under still another aspect, a non-transitory computer program product is provided that stores instructions which, when executed by a data processor forming part of a computing device, result in operations. The operations can include extracting from a file sequential data including discrete tokens. The operations also can include generating n-grams of the discrete tokens. The operations also can include generating a vector of weights based on respective frequencies of the n-grams. The operations also can include, based on a statistical analysis of the vector of weights, determining that the file is likely to be malicious. The operations also can include responsive to determining that the file is likely to be malicious, initiating a corrective action.

Non-transitory computer program products (i.e., physically embodied computer program products) are also described that store instructions, which when executed by one or more data processors of one or more computing systems, cause at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. For example, as compared to previously known techniques that detect malicious files based on an exact match between a file the user is attempting to open or use and an a priori known malicious file, the present subject matter can facilitate highly accurate detection of malicious files that may be different in multiple respects from known malicious files. Additionally, the present subject matter can consume relatively few processing resources so as to reduce the computational impact of detecting malicious files.

The details of one or more variations of the subject matter described herein are set forth in the accompanying drawings and the description below. Other features of the present subject matter will be apparent from the description and drawings, and from the claims.

DETAILED DESCRIPTION

Provided herein are systems, methods, and computer readable media for use in protecting devices from malicious files based on n-gram processing of sequential data. Such sequential data can include, for example, discrete "tokens," i.e., units of code within the file, such as discrete instructions for execution by a device's data processor. As provided herein and described in further detail below, n-grams of the discrete tokens can be generated. A vector of weights can be generated based on respective frequencies of the n-grams, e.g., representing frequencies and/or normalized frequencies of the respective n-grams relative to others of the n-grams, or within a corpus, or both. The vector of weights can be statistically analyzed to determine whether the file is likely to be malicious, and if so, then corrective action can be taken. For example, files that are malicious may be likely to include certain tokens and/or certain sequences of tokens. The vector of weights can reflect the frequency of tokens and/or of sequences of tokens and thus can reflect the likelihood that a file including those tokens and/or sequences of tokens is malicious. As such, statistically analyzing the vector of weights can provide an indication of whether a file is likely to be malicious, without the need for the file or code to exactly (or even approximately) match an a priori known malicious file.

Figure 1:
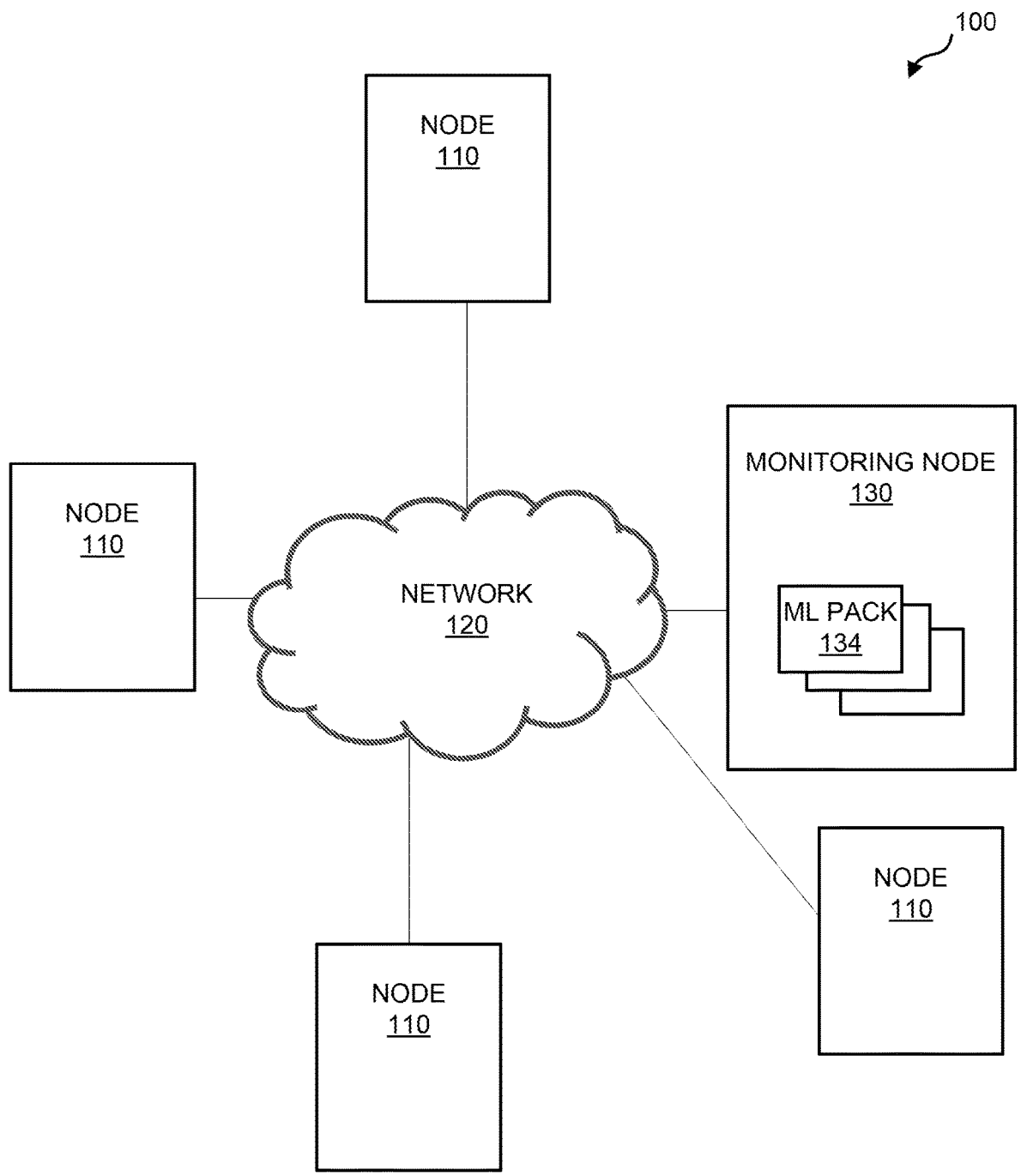
FIG. 1 is a system diagram illustrating a first computing environment for protecting devices from malicious files.

The present systems, methods, and computer readable media can be implemented within any suitable computing environment so as to take corrective action for malicious files. For example, FIG. 1 is a system diagram illustrating a first computing environment 100 for protecting devices from malicious files. Environment 100 includes a plurality of computing nodes 110, sometimes referred to as endpoints, and monitoring node 130. Computing nodes 110 can communicate with one another and with monitoring node 130 via network 120, e.g., the Internet, a wide area network (WAN), a local area network (LAN), or the like, and/or in a peer-to-peer fashion. Nodes 110 also can have access to remote computing systems and/or networks (not specifically illustrated) via network 120 or by other means. Each node 110 individually can include any suitable form of device, including, for example, a mobile phone, a tablet, a laptop computer, a desktop computer, a server, or the like.

In the exemplary configuration illustrated in FIG. 1, monitoring node 130 can be configured so as to monitor attempts to access files by nodes 110, and to protect nodes 110 from any malicious ones of those files. For example, each node 110 can include a data processor and a memory (not specifically illustrated) storing instructions which, when executed by the data processor of node 110, can cause the node to transmit a file to monitoring node 130 via network 120 before node 110 accesses, opens, or executes that file, and to receive from monitoring node 130 via network 120 an indication of whether a corrective action is to be taken by the data processor of node 110 or by monitoring node 130.

The tokens can be in any suitable format or language, e.g., can include machine language instructions, assembly language, binary, or a higher level language such as JAVASCRIPT or C++, and can be separated from one another in any suitable manner, e.g., can be tab delimited, space delimited, comma delimited, or the like, so as to be individually executable by a computer's data processor or usable by a programming language compiler or interpreter implemented by a computer's data processor, and so as to be individually identifiable by the present systems and methods so as to facilitate generation of n-grams based thereon.

Illustratively, monitoring node 130 can include a data processor and a memory (not specifically illustrated). The memory can store instructions, e.g., machine learning (ML) pack 134, which, when executed by the data processor, result in operations that determine whether a file is likely to be malicious and can initiate corrective action responsive to such determination. Illustratively, the instructions can cause the data processor of monitoring node 130 to extract from the file, which can be received from node 110, sequential data including discrete tokens. For example, ML pack 134 executed at monitoring node 130 can include a parser configured to parse the file received from node 110, to identify one or more portions of code within the file as being appropriate for analyzing whether those portion(s) may reflect whether the file is likely to be malicious, and to extract sequential data from within those identified portions. For example, files can include sequential data including syllables of machine language instructions within operation code ("opcode") that is specific to the respective operating system of node 110. In one non-limiting example, an entry point function of a portable executable (PE) file and/or a Nullsoft scriptable install system (NSIS) of the PE file can include certain opcodes that are relatively likely to be associated with malicious files. The parser of ML pack 134 can be configured so as to identify one or more suitable sections of the file for analysis, such as the entry point function and/or NSIS of the PE file, e.g., based on characteristic codes therein, and to extract syllables of opcode therefrom. One nonlimiting, purely illustrative example of sequential data including respective syllables of opcode written in machine language, which can be extracted by ML pack 134, is:

8B 55 8B E8 E8 5D C3    (1)

ML pack 134 can be configured so as to generate n-grams of the discrete tokens extracted by monitoring node 130, e.g., n-grams of syllables of opcode or other discrete units of code extracted from the file received from node 110 (e.g., tokens 8B, 55, 8B, etc. in example (1)). By "n-grams" it is meant a plurality of sequences of the tokens, each of the sequences including up to n of the tokens in the order in which the tokens occur in the sequential data. The value of n can be any suitable number, e.g., can be 1, 2, or can be 2 or less, e.g., can be 3 or less, 4 or less, 5 or less, 6 or less, 7 or less, 8 or less, 9 or less, 10 or less, 11 or less, 12 or less, 13 or less, 14 or less, 15 or less, 16 or less, 17 or less, 18 or less, 19 or less, or 20 or less. For example, continuing with the above nonlimiting example, ML pack 134 can be configured so as to generate 1-grams (which also can be called unigrams) of the discrete tokens expressed above at (1), such as:

[8B, 55, E8, 5D, C3]    (2)

where the commas indicate separation between the n-grams. Or, for example, still continuing with the above nonlimiting example, ML pack 134 can be configured so as to generate 2-grams (which also can be called bigrams) of the discrete tokens expressed above at (1), such as:

[8B 55,55 8B, 8B E8, E8 E8, E8 5D, 5D C3]    (3).

Or, for example, still continuing with the above nonlimiting example, ML pack 134 can be configured so as to generate 3-grams (which also can be called trigrams) of the discrete tokens expressed above at (1), such as:

[8B 55 8B, 55 8B E8, 8B E8 E8, E8 E8 5D, E8 5D C3]    (4).

In some configurations, generating n-grams of the tokens includes generating up to n-grams of the tokens, meaning generating 1-grams of the tokens, 2-grams of the tokens, and so on up to and including n-grams of the tokens. For example, still continuing with the above nonlimiting example, ML pack 134 can be configured so as to generate up to 2-grams (that is, both 1-grams and 2-grams) of the discrete tokens expressed above at (1), such as:

[8B, 55, E8, 5D, C3, 8B 55, 55 8B, 8B E8, E8 E8, E8 5D, 5D C3]    (5).

Or, for example, still continuing with the above nonlimiting example, ML pack 134 can be configured so as to generate up to 3-grams (that is, 1-grams, 2-grams, and 3-grams) of the discrete tokens expressed above at (1), such as:

[8B, 55, E8, 5D, C3, 8B 55, 55 8B, 8B E8, E8 E8, E8 5D, 5D C3, 8B 55 8B, 55 8B E8, 8B E8 E8, E8 E8 5D, E8 5D C3]    (6).

In some configurations, each n-gram is unique. For example, in the case of 1-grams above, the tokens E8 and 8B each occur twice among the tokens, and only one 1-gram is generated for each token. The n-grams respectively can include each sequence of n tokens in the order in which they occur within the sequential data, e.g., sequences such as 8B 55 or 55 8B for n=2, or such as 8B 55 8B or 55 8B E8 for n=3, and so on. In some configurations, the n-grams optionally can include each real-number sequence of 1, 2 . . . (n) tokens in the order in which they occur within the sequential data, e.g., can include up to n-grams. In a nonlimiting example where n=1, the vector of n-grams can have as many elements as the number of discrete tokens extracted from the file received from node 110. In examples where n>1, the number of n-grams can be significantly greater than the number of discrete tokens extracted from the file received from node 110.

ML pack 134 further can be configured so as to generate a vector of weights based on respective frequencies of the n-grams. The vector of weights can be generated using any suitable method. For example, the vector of weights can be generated based on respective frequencies of the n-grams, e.g., based on frequencies and/or normalized frequencies of the respective n-grams among the other n-grams, or within a corpus, or both. The respective frequency of each n-gram among the other n-grams can be referred to as a "term frequency" (TF). Certain tokens (e.g., opcode syllables) or certain sequences of tokens may be more likely than others to be associated with malicious files. A vector of weights based on the TF (raw or normalized) of n-grams of such tokens thus can be directly related to the frequency with which likely relevant tokens or sequences of such tokens are present within the extracted sequential data.

TF can refer to the raw TF, e.g., can refer to the raw number of respective instances of each n-gram among the other n-grams; or can refer to a suitably normalized or scaled TF. For example, based upon a given n-gram occurring once among the n-grams, then the raw TF of that n-gram can be equal to 1, or based upon a given n-gram occurring twice among the n-grams, then the raw TF of that n-gram can be equal to 2. Such a raw TF analysis can be referred to as "bag of words" (BOW). Illustratively, continuing with the nonlimiting example (5) above for an up to 2-gram of the tokens of example (1), the vector of raw TF (BOW) can be expressed as:

8B=2

55=1

E8=2

5D=1

C3=1

8B 55=1

55 8B=1

8B E8=1

E8 E8=1

E8 5D=1

5D C3=1        (7).

A normalized TF can be obtained by normalizing the elements of the raw TF (BOW) vector using a normalization factor such as:

1/sqrt(sum((raw TF)$^2$))        (8).

For the above example (7), the normalization factor will be 1/sqrt(2^2+1^2+2^2+1^2+1^2+1^2+1^2+1^2+1^2+1^2)=0.2425 resulting in a normalized TF vector that can be expressed as:

8B=0.485

55=0.2425

E8=0.485

5D=0.2425

C3=0.2425

8B 55=0.2425

55 8B=0.2425

8B E8=0.2425

E8 E8=0.2425

E8 5D=0.2425

5D C3=0.2425        (9).

Optionally, n-grams that are possible and that do not occur in the vector of n-grams (e.g., n-grams that correspond to opcodes that are available for use in the sequential data but that are not included) can have a weight, e.g., TF (raw or normalized), of 0.

Optionally, the TF of a given n-gram occurring t times among a set of n-grams that includes d elements can be logarithmically scaled, for example, using:

TF(t,d)=1+log(f$_{t,d}$)        (10)

or can be normalized using double normalization or any other suitable scaling or normalization.

The respective frequency of each n-gram within a corpus can be referred to as an "inverse document frequency" (IDF). For example, based upon a given n-gram occurring t times within a corpus that includes N documents, the IDF can be expressed as:

$$IDF(t, N) = \log\frac{N}{t} + 1. \quad (11)$$

Certain tokens (e.g., opcode syllables) or certain sequences of tokens may be used frequently in a benign manner, and thus may be less likely than others to be associated with malicious files. A vector of weights based on the IDF of n-grams of such tokens thus can be inversely related to the frequency with which potentially relevant tokens or sequences are present within the extracted sequential data. Continuing with the nonlimiting example (5) above for an up to 2-gram of the tokens of example (1) having the vector of raw TF (BOW) of example (7), say that the total size of the dataset is 500 documents (e.g., 500 files), that the 1-grams 8B and 5D each appear in 100 documents in the whole dataset, that the 2-gram 5D C3 appears in 50 documents in the whole dataset, and that the other 1-grams and 2-grams each appear only once in the whole dataset. A resulting exemplary IDF can be expressed as:

8B=log(500/100)+1=1.69897

55=log(500/1)+1=3.69897

E8=log(500/1)+1=3.69897

5D=log(500/100)+1=1.69897

C3=log(500/1)+1=3.69897

8B 55=log(500/1)+1=3.69897

55 8B=log(500/1)+1=3.69897

8B E8=log(500/1)+1=3.69897

E8 E8=log(500/1)+1=3.69897

E8 5D=log(500/1)+1=3.69897

5D C3=log(500/50)+1=2        (12).

It should be understood that there are other ways of calculating IDF that can generate different numbers than the exemplary formula presented in (11), but that can suitably normalize the term frequencies based on how often a token appears in the overall corpus.

In some configurations, ML pack 134 can be configured so as to generate the vector of weights by generating a vector of TFs of the n-grams, generating a vector of the IDFs of the n-grams, and taking the dot product of the TF vector and the IDF vector. The resulting vector, the elements of which can be referred to as the TFIDFs of the respective n-grams, can be expected to relatively enhance the weights of n-grams associated with tokens or token sequences that are more likely to be included in malicious files (via the TF terms of the dot product), and can be expected to relatively reduce the weights of n-grams associated with tokens or token sequences that are more likely to be included in benign files (via the IDF terms of the dot product).

Continuing with example (12), the raw number of occurrences of each n-gram times the IDF of that n-gram (e.g., the TFIDF) can be expressed as:

8B=2*1.69897=3.39794

55=1*3.69897=3.69897

E8=2*3.69897=7.39794

5D=1*1.69897=1.69897

C3=1*3.69897=3.69897

8B 55=1*3.69897=3.69897

55 8B=1*3.69897=3.69897

8B E8=1*3.69897=3.69897

E8 E8=1*3.69897=3.69897

E8 5D=1*3.69897=3.69897

5D C3=1*2=2        (13).

Such vector optionally can be normalized so that the sum of squares of non-zero elements equals to 1. For example (13), such a normalization factor can be expressed as:

$$1/\text{sqrt}(3.39794^2+3.69897^2+7.39794^2+1.69897^2+$$
$$3.69897^2+3.69897^2+3.69897^2+3.69897^2+$$
$$3.69897^2+3.69897^2+2^2)=0.0769 \quad (14).$$

It should be appreciated that any suitable manner of generating a vector of weights of n-grams of a vector of n-grams can be implemented. Optionally, the vector of TFs, IDFs, TFIDFs, or any other suitably generated weights can be normalized or scaled in any suitable manner.

ML pack 134 can be configured, based on a statistical analysis of the vector of weights, to determine that the file received from node 110 is likely to be malicious. In one nonlimiting example, the statistical analysis of the vector of weights can include performing a logistic regression on the vector of weights, or inputting the vector of weights to a machine learning model, or both. In one nonlimiting example, ML pack 134 performs a logistic regression on the vector of weights and generates, based thereon, an output representative of the likelihood that the file is malicious. ML pack 134 can compare such output to a threshold, and based upon the output being above the threshold can determine that the file is likely to be malicious, and/or based upon the output being below the threshold can determine that the file is likely to be benign. Additionally, or alternatively, ML pack 134 can provide the vector of weights to a suitable machine learning model that generates, based on thereon, an output representative of the likelihood that the file is malicious. Additionally, or alternatively, ML pack 134 can provide the output of a logistic regression to a suitable machine learning model that generates, based on thereon, an output representative of the likelihood that the file is malicious. Additionally, or alternatively, ML pack 134 can provide the output of a logistic regression and the vector of weights to a suitable machine learning model that generates, based on thereon, an output representative of the likelihood that the file is malicious. The logistic regression output and/or the vector of weights can be provided to the machine learning model in addition to any other suitable information about the file.

ML pack 134 can include any suitable machine learning model, and indeed can include a plurality of machine learning models that can be configured so as to analyze different aspects of the file received from node 110. Illustratively, the machine learning model can be selected from the group consisting of generalized linear models, ordinary least squares, ridge regression, lasso, multi-task lasso, elastic net, multi-task elastic net, least angle regression, LARS lasso, orthogonal matching pursuit, Bayesian regression, naive Bayesian, logistic regression, stochastic gradient descent, neural networks, Perceptron, passive aggressive algorithms, robustness regression, Huber regression, polynomial regression, linear and quadratic discriminant analysis, kernel ridge regression, support vector machines, stochastic gradient descent, nearest neighbor, Gaussian processes, cross-decomposition, decision trees, random forest, and ensemble methods. For nonlimiting examples of implementation of machine learning models and information that can be provided to machine learning models for use in determining that a file is likely to include malicious code, see the following patents and applications, the entire contents of each of which are incorporated herein by reference: U.S. Pat. No. 9,262,296 to Soeder et al.; U.S. Pat. No. 9,495,633 to Davis et al.; U.S. Provisional Patent Application No. 62/385,906, filed Sep. 9, 2016 and entitled "Training a Machine Learning Model for Script Analysis;" U.S. patent application Ser. No. 15/345,436, filed Nov. 7, 2016; and U.S. Provisional Patent Application No. 62/445,172, filed Jan. 11, 2017 and entitled "Endpoint Detection and Response Utilizing Machine Learning."

ML pack 134 also can be configured so as to initiate, responsive to determining that the file is likely to be malicious, a corrective action. Exemplary corrective actions include, but are not limited to, quarantining the file, stopping execution of the file, flagging the file, notifying the user that the file likely is malicious, storing the file, generating a hash of the file, transmitting the file or a hash of the file, or reverting to an earlier version of the file or device software. For example, the corrective action can include monitoring node 130 transmitting to node 110 an instruction to quarantine the file, an instruction not to execute the file, and/or to notify the user that the file likely is malicious. Additionally, or alternatively, the corrective action can include monitoring node 130 flagging the file, storing the file, generating and storing a hash of the file, and/or transmitting the file or a hash of the file, e.g., to a repository. The repository optionally can be used so as to train or refine a machine learning model.

Note that not every file attempted to be accessed, opened, or executed by node 110 necessarily needs to be transmitted to monitoring node 130. For example, node 110 can generate a signature of each file that is attempted to be accessed, opened, or executed, such as a hash of that file, and can transmit the hash of that file to monitoring node 130. Monitoring node 130 can be configured so as to compare the hash received from node 110 to stored hashes of files known to be malicious or known to be benign. Based upon the hash received from node 110 matching that of a file known to be malicious, monitoring node 130 can take corrective action such as mentioned herein. Based upon the hash received from node 110 matching that of a file known to be benign, monitoring mode 130 can signal to node 100 that the file can be used as desired.

Figure 2:
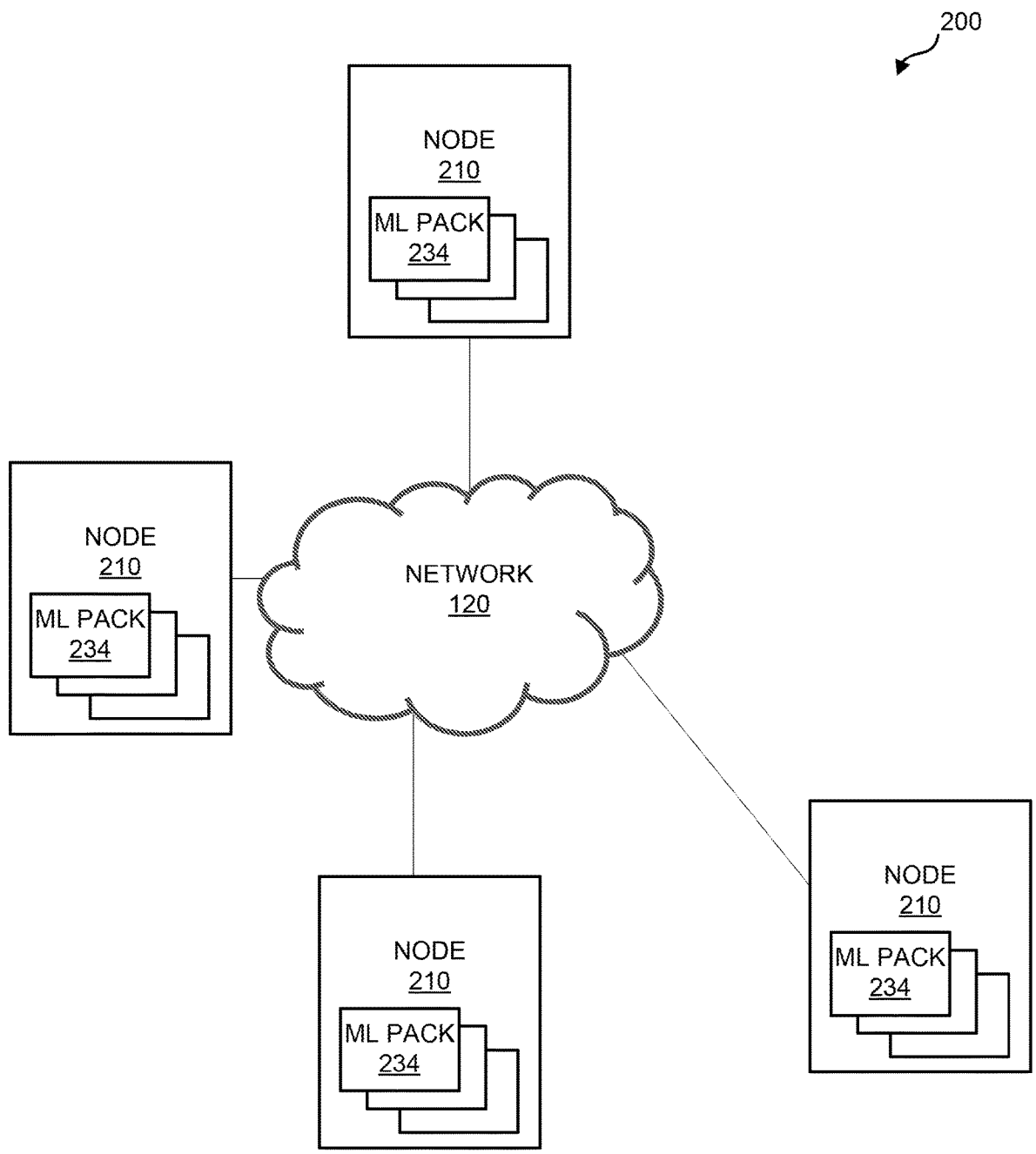
FIG. 2 is a system diagram illustrating a second computing environment for protecting devices from malicious files.

Note that FIG. 1 illustrates only one exemplary configuration, and that other configurations are possible. For example, FIG. 2 is a system diagram illustrating a second computing environment 200 for protecting devices from malicious files. Computing environment 200 can be configured similarly as environment 100, e.g., includes a plurality of computing nodes 110 that can communicate with one another and with monitoring node 130 via network 120. In environment 200, monitoring node 130 optionally can be omitted, and each node 110 can include ML pack 234 that can operate similarly as ML pack 134, but can be implemented directly at node 110 to locally protect that node from files at that node, rather than requiring transmittal of such files to a remote monitoring node 130. In still another configuration, any suitable number of data processors are distributed across a computing environment, each of which can be configured so as to perform any suitable operation or combination of operations such as provided herein.

Figure 3:
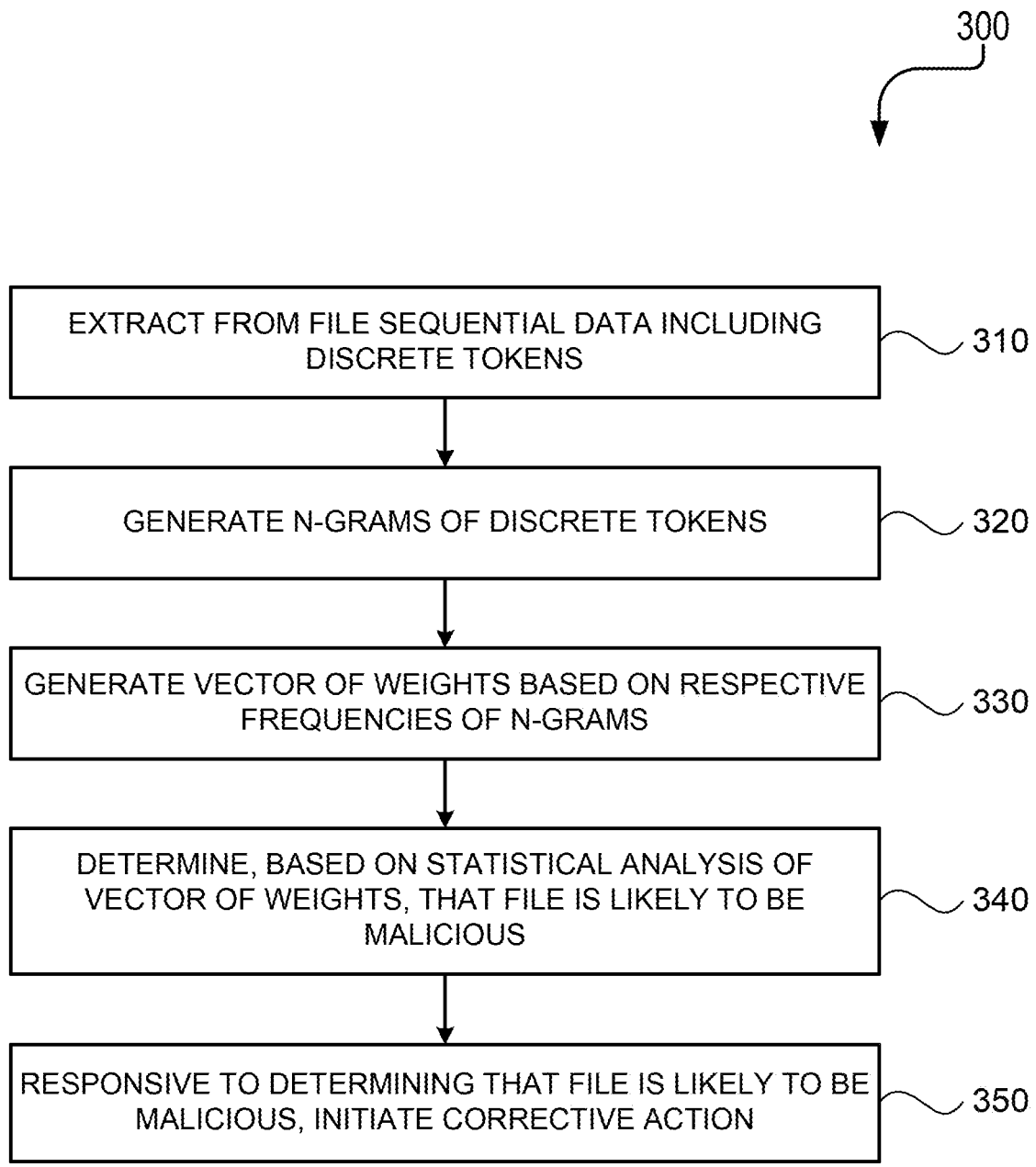
FIG. 3 is a process flow diagram illustrating operations for protecting devices from malicious files.

FIG. 3 is a process flow diagram 300 illustrating operations for protecting devices from malicious files. The operations can be implemented by one or more data processors forming part of at least one computing device. The operations can include extracting from the file, by at least one data processor, sequential data including discrete tokens (310). For example, at least one data processor at monitoring node 130 and/or at node 110 can extract sequential data from the file in a manner such as described above with reference to FIGS. 1-2. The operations also can include generating, by at least one data processor, n-grams of the discrete tokens (320). For example, at least one data processor at monitoring node 130 and/or at node 110 can generate n-grams in a manner such as described above with reference to FIGS. 1-2. The operations also can include generating, by at least one data processor, a vector of weights based on respective frequencies of the n-grams (330). For example, at least one data processor at monitoring node 130 and/or at node 110 can generate a vector of weights in a manner such as described above with reference to FIGS. 1-2. The operations also can include determining, by at least one data processor and based on a statistical analysis of the vector of weights, that the file is likely to be malicious (340). For example, at least one data processor at monitoring node 130 and/or at node 110 can determine that the file is likely to be malicious in a manner such as described above with reference to FIGS. 1-2. The operations also can include initiating, by at least one data processor and responsive to determining that the file is likely to be malicious, a corrective action (350). For example, at least one data processor at monitoring node 130 and/or at node 110 can initiate corrective action in a manner such as described above with reference to FIGS. 1-2. Exemplary computing environments, files, tokens, n-grams, operation codes, vectors, statistical analyses, machine learning models, and corrective actions suitable for implementation in the process flow of FIG. 3 are provided above with reference to FIGS. 1-2.

In still another example, a non-transitory computer program product is provided herein that stores instructions which, when executed by a data processor forming part of a computing device, result in operations including extracting from the file sequential data comprising discrete tokens; generating n-grams of the discrete tokens; generating a vector of weights based on respective frequencies of the n-grams; based on a statistical analysis of the vector of weights, determining that the file is likely to be malicious; and responsive to determining that the file is likely to be malicious, initiating a corrective action.

EXAMPLES

The following examples are intended to be purely illustrative, and not limiting in any way.

In one example, entry point functions of PE files were analyzed using different approaches for determining whether those files were likely to be malicious, and using different n-grams. A linear classifier was trained using a first set of entry point functions, of which approximately 160,000 were from benign files and approximately 160,000 were from malicious files; and validated using a second set of entry point functions, of which approximately 34,000 were from benign files and approximately 34,000 were from malicious files. The trained linear classifier was tested using different approaches for generating the vector of weights (operation 330), a logistic regression model with no regularization, and a third set of entry point functions, of which approximately 31,000 were from benign files and approximately 31,000 were from malicious files. Table 1 below shows the calculated accuracy and the number of features resulting from implementation of various approaches (described below) generating vectors of weights for different n-grams.

TABLE 1

| ngram | OHE | BOW | TF | TFIDF | num_features |
|---|---|---|---|---|---|
| 1 | 0.763739 | 0.766502 | 0.820587 | 0.822041 | 850 |
| 2 | na | 0.802704 | 0.849666 | 0.858534 | 59677 |
| 3 | na | 0.829311 | 0.854318 | 0.868421 | 426684 |
| 4 | na | 0.833382 | 0.859988 | 0.871620 | 1201034 |
| 5 | na | 0.824658 | 0.862460 | 0.872347 | 2328120 |
| 6 | na | 0.840215 | 0.864495 | 0.872783 | 3789770 |

TABLE 1-continued

| ngram | OHE | BOW | TF | TFIDF | num_features |
|---|---|---|---|---|---|
| 7 | na | 0.839052 | 0.867694 | 0.873074 | 5607939 |
| 8 | na | 0.834400 | 0.868130 | 0.873510 | 7888932 |

Bag of words (BOW) in Table 1 was used to generate a vector of weights based on raw TF mentioned further above. TF in Table 1 was used to generate a vector of weights based on normalized TF such as described above with reference to equation (6). TFIDF in Table 1 was used to generate a normalized vector of weights based on TF and IDF such as described above with reference to equations (7)-(14). One hot encoding (OHE) in Table 1 is not considered to generate a vector of weights such as provided herein, but is provided as a comparison. OHE generates a binary indication of whether or not a given token is present in sequential data, e.g., of whether a given instruction is present in opcode. In the exemplary tokens expressed at (1), each included operation receives a value of 1, including 5B (which occurs twice); any operations that are available for use but do not occur in the sequential receive a value of 0.

Figure 4:
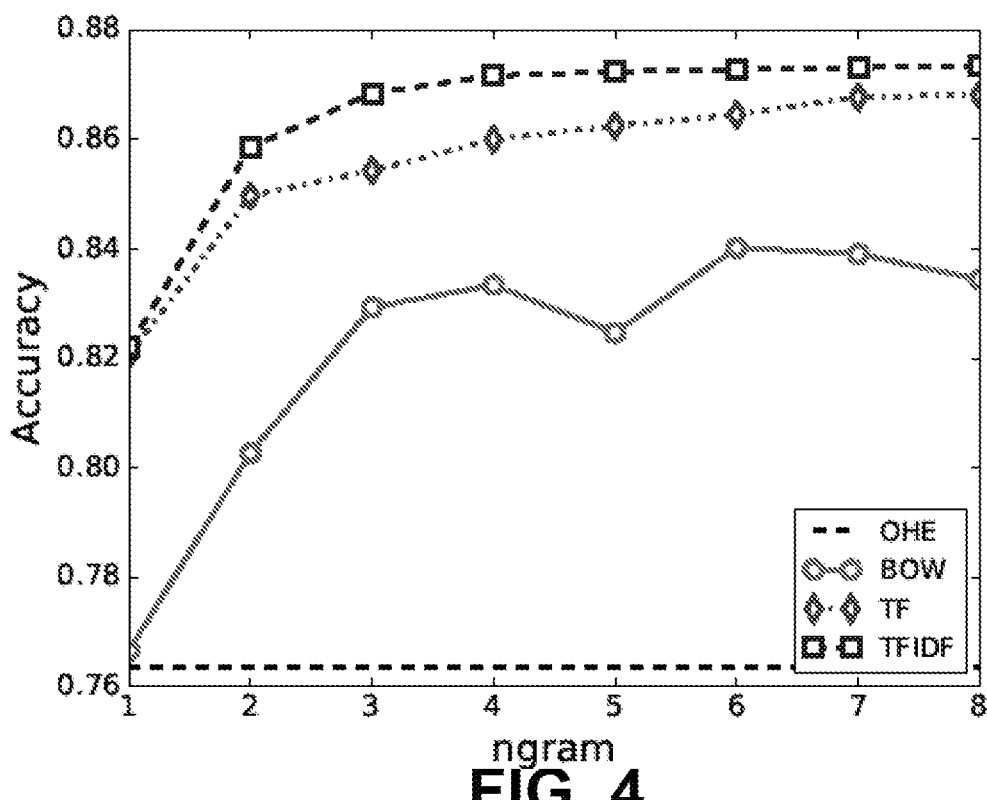
FIG. 4 is a plot illustrating accuracy of different exemplary approaches for determining whether exemplary files are likely to be malicious based on different n-grams of code in the files.

FIG. 4 is a plot illustrating accuracy of different exemplary approaches for determining whether exemplary files are likely to be malicious based on different n-grams of code in the files. More specifically, FIG. 4 is a plot illustrating accuracy of the OHE, BOW, TF, and TFIDF approaches such as shown in Table 1. From FIG. 4 and Table 1, it can be understood that the accuracy of BOW exceeded that of OHE for all values of n greater than one; that the accuracy of TF and TFIDF exceeded that of BOW and OHE for all values of n (including n=1); and that the accuracy of TFIDF exceeded that of TF for all values of n greater than one. Additionally, the accuracy of TFIDF appears to converge at approximately n=4, where TFIDF has an accuracy (about 87%) that is approximately 11% greater than that of OHE (about 76%).

Based on the results shown in Table 1 and FIG. 4, TFIDF was selected for further analysis. More specifically, accuracy (ACC), true positive rate (TPR), and true negative rate (TNR) were calculated using TFIDF using n=4 and different numbers of features such as shown below in Table 2.

TABLE 2

| ACC | TNR | TPR | num_features |
|---|---|---|---|
| 0.871620 | 0.830474 | 0.912765 | 1201034 |
| 0.871620 | 0.831056 | 0.912184 | 1000000 |
| 0.871329 | 0.833673 | 0.908985 | 100000 |
| 0.861297 | 0.822041 | 0.900552 | 10000 |
| 0.852428 | 0.823786 | 0.881070 | 5000 |
| 0.848212 | 0.808665 | 0.887758 | 1000 |
| 0.838325 | 0.810992 | 0.865659 | 500 |
| 0.841088 | 0.810992 | 0.871183 | 300 |

Figure 5:
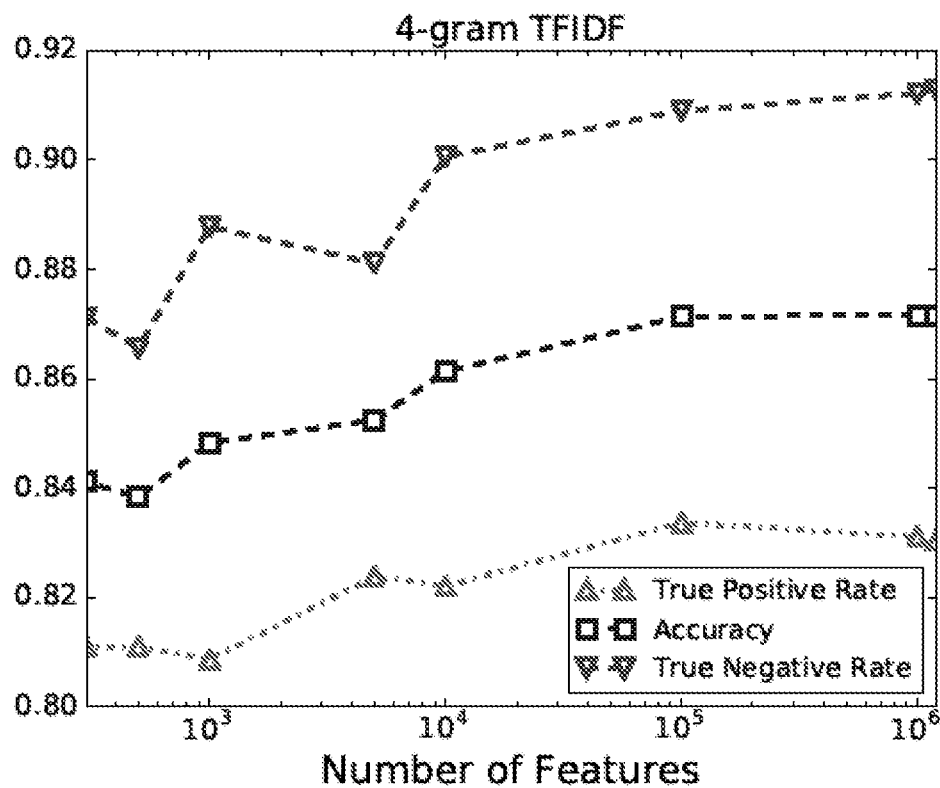
FIG. 5 is a plot illustrating accuracy (ACC), true positive rate (TPR), and true negative rate (TNR) of an exemplary approach for determining whether the exemplary files of FIG. 4 are likely to be malicious based on different numbers of features for 4-grams of code in the files.

FIG. 5 is a plot illustrating ACC, TPR, and TNR of an exemplary approach for determining whether the exemplary files of FIG. 4 are likely to be malicious based on different numbers of features for 4-grams of code in the files. More specifically, FIG. 5 is a plot illustrating the results for the exemplary TFIDF approach shown in Table 2. From FIG. 5 and Table 2, it can be understood that the accuracies of TFIDF for 100,000 features, for 1,000,000 features, and for about 1,200,000 features were similar to one another. It therefore can be understood that an appropriate number of features can be selected so as to reduce computing effort while maintaining a desired level of accuracy. Indeed, as an additional comparison, LSTM processing such as described in U.S. Provisional Patent Application No. 62/385,906, filed Sep. 9, 2016 and entitled "Training a Machine Learning Model for Script Analysis" and in U.S. patent application Ser. No. 15/345,436, filed Nov. 7, 2016 was implemented using gensim to train word2vec embedding, setting the dimension of embedding to 100 and the sequence length to 300. LSTM models provided an accuracy of approximately 86%, which was similar to (or even slightly lower than) TFIDF such as shown in Table 2, but required significantly greater computing power. For example, if LSTM can be expected to take about 10 hours on a GPU for model training, TFIDF with logistic regression on the same dataset can be performed within less than an hour. It therefore can be understood that the present n-gram based approaches can provide similar accuracy as more computationally complex approaches, and thus can reduce the computational burden for determining whether a file is likely to be malicious.

In another example, NSIS of PE files were analyzed using different approaches for determining whether those files were likely to be malicious, and using different n-grams. A linear classifier was trained using a first set of NSIS opcodes, of which approximately 20,382 were from benign files and approximately 20,382 were from malicious files; and tested using a second set of NSIS codes, of which approximately 4,198 were from benign files and approximately 4,198 were from malicious files. Table 3 below shows the calculated accuracy and the number of features resulting from implementation of the OHE, BOW, TF, and TFIDF approaches (described above) generating vectors of weights for different n-grams.

TABLE 3

| ngram | OHE | BOW | TF | TFIDF | num_features |
|---|---|---|---|---|---|
| 1 | 0.835517 | 0.836827 | 0.824202 | 0.835040 | 34920 |
| 2 | na | 0.853859 | 0.866246 | 0.888280 | 113811 |
| 3 | na | 0.857313 | 0.881134 | 0.910672 | 239683 |
| 4 | na | 0.859100 | 0.887923 | 0.921510 | 473847 |
| 5 | na | 0.864102 | 0.894235 | 0.926036 | 869024 |
| 6 | na | 0.871367 | 0.898880 | 0.930086 | 1445164 |
| 7 | na | 0.866603 | 0.901858 | 0.933302 | 2211057 |
| 8 | na | 0.863506 | 0.905431 | 0.935803 | 3171389 |
| 9 | na | na | na | 0.938304 | 4324287 |
| 10 | na | na | na | 0.940091 | 5666821 |
| 11 | na | na | na | 0.940924 | 7197245 |
| 12 | na | na | na | 0.941758 | 8912873 |
| 13 | na | na | na | 0.941877 | 10808706 |
| 14 | na | na | na | 0.942115 | 12878422 |
| 15 | na | na | na | 0.942592 | 15115576 |
| 16 | na | na | na | 0.942115 | 17514607 |
| 17 | na | na | na | 0.942592 | 20070844 |
| 18 | na | na | na | 0.942949 | 22781543 |
| 19 | na | na | na | 0.942949 | 25645781 |
| 20 | na | na | na | 0.943306 | 28663407 |

Figure 6:
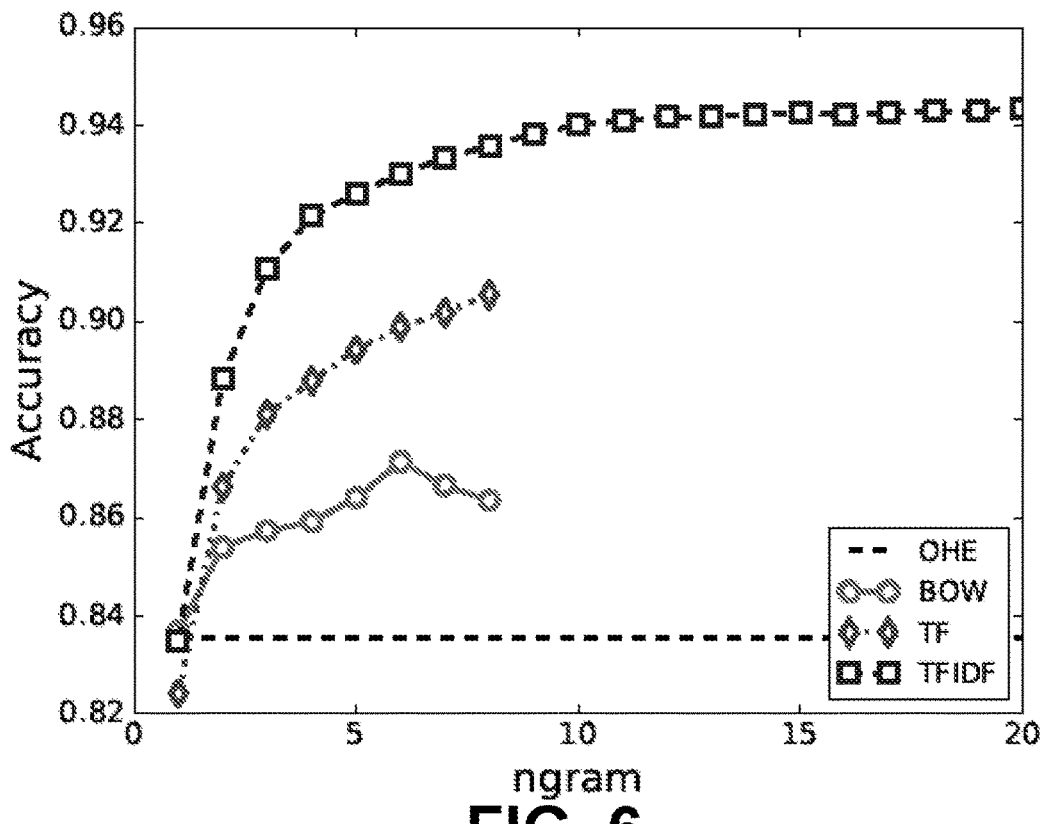
FIG. 6 is a plot illustrating accuracy of different exemplary approaches for determining whether exemplary files are likely to be malicious based on different n-grams of code in the files.

FIG. 6 is a plot illustrating accuracy of different exemplary approaches for determining whether exemplary files are likely to be malicious based on different n-grams of code in the files. More specifically, FIG. 6 is a plot illustrating accuracy of the OHE, BOW, TF, and TFIDF approaches such as shown in Table 3. From FIG. 6 and Table 3, it can be understood that the accuracy of BOW, TF, and TFIDF exceeded that of OHE for all values of n greater than one; that the accuracy of TF and TFIDF exceeded that of BOW for all values of n greater than one; and that the accuracy of TFIDF exceeded that of TF for all values of n greater than one. Additionally, the accuracy of TFIDF appears to converge at approximately n=15, where TFIDF has an accuracy (about 94%) that is approximately 10% greater than that of OHE (about 84%).

Based on the results shown in Table 3 and FIG. 6, TFIDF was selected for further analysis. More specifically, ACC, TNR, and TPR were calculated using TFIDF using n=15 and different numbers of features such as shown below in Table 4.

TABLE 4

| ACC | TNR | TPR | num_features |
|---|---|---|---|
| 0.942592 | 0.968080 | 0.917103 | 15000000 |
| 0.941401 | 0.965698 | 0.917103 | 5000000 |
| 0.937708 | 0.964507 | 0.910910 | 1000000 |
| 0.933778 | 0.962601 | 0.904955 | 500000 |
| 0.924131 | 0.953073 | 0.895188 | 100000 |

Figure 7:
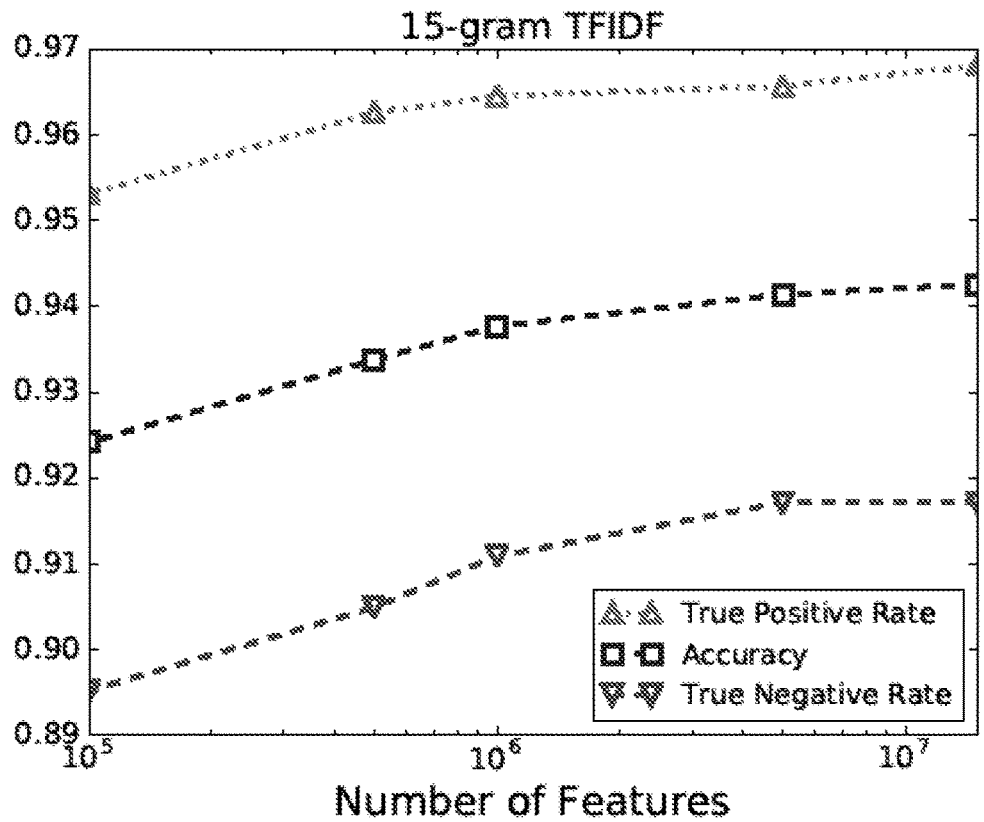
FIG. 7 is a plot illustrating ACC, TPR, and TNR of the exemplary approach of FIG. 5 for detecting whether the exemplary files of FIG. 6 are likely to be malicious based on different numbers of features for 15-grams of code in the files.

FIG. 7 is a plot illustrating ACC, TPR, and TNR of an exemplary approach for determining whether the exemplary files of FIG. 6 are likely to include malicious code based on different numbers of features for 15-grams of code in the files. More specifically, FIG. 7 is a plot illustrating the results for the exemplary TFIDF approach shown in Table 4. From FIG. 7 and Table 4, it can be understood that the accuracies of TFIDF for 500,000 features, for 1,000,000 features, for 5,000,000, and for about 15,000,000 features were similar to one another. It therefore can be understood that an appropriate number of features can be selected so as to reduce computing effort while maintaining a desired level of accuracy. Indeed, as an additional comparison, LSTM processing such as described in U.S. Provisional Patent Application No. 62/385,906, filed Sep. 9, 2016 and entitled "Training a Machine Learning Model for Script Analysis" and in U.S. patent application Ser. No. 15/345,436, filed Nov. 7, 2016 was implemented using gensim to train word2vec embedding, setting the dimension of embedding to 100 and the sequence length to 300. LSTM models provided an accuracy of approximately 94%, which was similar to (or even slightly lower than) TFIDF such as shown in Table 4, but required significantly greater computing power similarly as described above. It therefore can be understood that the present n-gram based approaches can provide similar accuracy as more computationally complex approaches, and thus can reduce the computational burden for determining whether a file is likely to include malicious code.

Additional Alternative Configurations

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, can include machine instructions for a programmable processor, and/or can be implemented in a high-level procedural language, an object-oriented programming language, a functional programming language, a logical programming language, and/or in assembly/machine language. As used herein, the term "computer-readable medium" refers to any computer program product, apparatus and/or device, such as for example magnetic discs, optical disks, solid-state storage devices, memory, and Programmable Logic Devices (PLDs), used to provide machine instructions and/or data to a programmable data processor, including a machine-readable medium that receives machine instructions as a computer-readable signal. The term "computer-readable signal" refers to any signal used to provide machine instructions and/or data to a programmable data processor. The computer-readable medium can store such machine instructions non-transitorily, such as for example as would a non-transient solid-state memory or a magnetic hard drive or any equivalent storage medium. The computer-readable medium can alternatively or additionally store such machine instructions in a transient manner, such as for example as would a processor cache or other random access memory associated with one or more physical processor cores.

The computer components, software modules, functions, data stores and data structures described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

Figure 8:
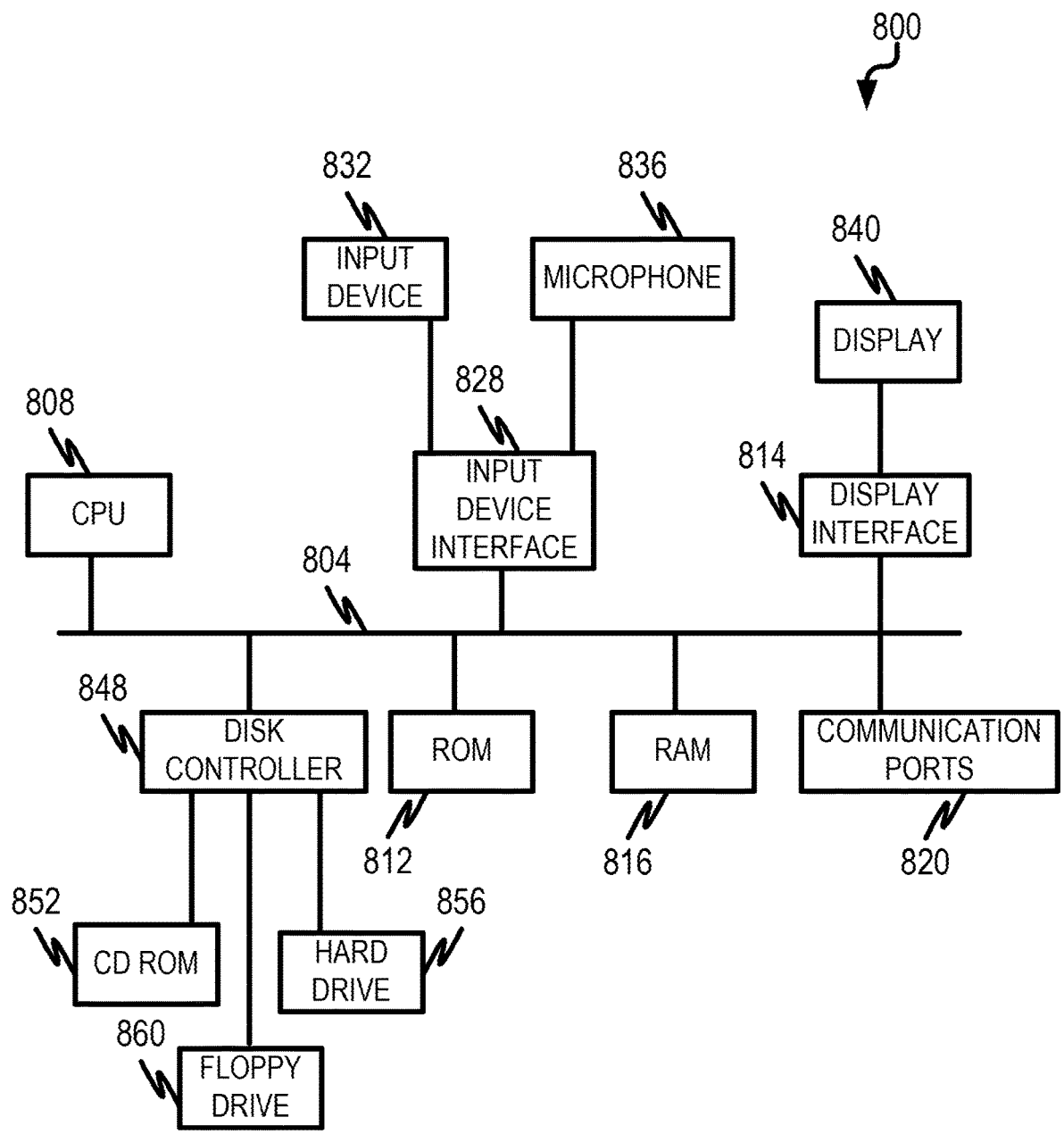
FIG. 8 is a diagram illustrating a sample computing device architecture for implementing various aspects described herein.

FIG. 8 is a diagram 800 illustrating a sample computing device architecture for implementing various aspects described herein. A bus 804 can serve as the information highway interconnecting the other illustrated components of the hardware. A processing system 808 labeled CPU (central processing unit) (e.g., one or more computer processors/data processors at a given computer or at multiple computers), can perform calculations and logic operations required to execute a program. A non-transitory processor-readable storage medium, such as read only memory (ROM) 812 and random access memory (RAM) 816, can be in communication with the processing system 808 and can include one or more programming instructions for the operations specified here. Optionally, program instructions can be stored on a non-transitory computer-readable storage medium such as a magnetic disk, optical disk, recordable memory device, flash memory, or other physical storage medium.

In one example, a disk controller 848 can interface one or more optional disk drives to the system bus 804. These disk drives can be external or internal floppy disk drives such as 860, external or internal CD-ROM, CD-R, CD-RW or DVD, or solid state drives such as 852, or external or internal hard drives 856. As indicated previously, these various disk drives 852, 856, 860 and disk controllers are optional devices. The system bus 804 can also include at least one communication port 820 to allow for communication with external devices either physically connected to the computing system or available externally through a wired or wireless network. In some cases, the communication port 820 includes a network interface.

To provide for interaction with a user, the subject matter described herein can be implemented on a computing device having a display device 840 (e.g., a CRT (cathode ray tube) or LCD (liquid crystal display) monitor) for displaying information obtained from the bus 804 to the user and an input device 832 such as keyboard and/or a pointing device (e.g., a mouse or a trackball) and/or a touchscreen by which the user can provide input to the computer. Other kinds of input devices 832 can be used to provide for interaction with a user as well; for example, feedback provided to the user can be any form of sensory feedback (e.g., visual feedback, auditory feedback by way of a microphone 836, or tactile feedback); and input from the user can be received in any form, including acoustic, speech, or tactile input. In the input device 832 and the microphone 836 can be coupled to and convey information via the bus 804 by way of an input device interface 828. Other computing devices, such as dedicated servers, can omit one or more of the display 840 and display interface 824, the input device 832, the microphone 836, and input device interface 828.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed:

1. A method for protecting a device from a malicious file, the method being implemented by one or more data processors forming part of at least one computing device and comprising:

identifying one or more suitable sections associated with the file for analysis based on characteristic codes therein, the file being a portable executable (PE) file, the suitable sections comprising at least one of: an entry point function of the PE file or a Nullsoft scriptable install system (NSIS) associated with the PE file;

extracting from the identified one or more suitable sections of the file, by at least one data processor, sequential data comprising discrete tokens, the discrete tokens being Nullsoft scriptable install system (NSIS) opcodes;

generating, by at least one data processor, n-grams of the discrete tokens;

generating, by at least one data processor using a bag of words algorithm, a vector of weights based on respective frequencies of the n-grams;

determining, by at least one data processor and based on a statistical analysis of the vector of weights, that the file is likely to be malicious; and initiating, by at least one data processor and responsive to determining that the file is likely to be malicious, a corrective action.

2. The method of claim 1, wherein the extracted sequential data comprises operation code.

3. The method of claim 2, wherein the discrete tokens respectively comprise syllables of machine language instructions within the operation code.

4. The method of claim 1, wherein generating the vector of weights comprises:
determining, by at least one data processor, a term frequency of each of the n-grams among the other n-grams.

5. The method of claim 4, wherein generating the vector of weights further comprises:
determining, by at least one data processor, an inverse document frequency of each of the n-grams within a corpus.

6. The method of claim 5, wherein generating the vector of weights further comprises:
generating, by at least one data processor, a dot product of the term frequency and the inverse document frequency for each of the n-grams.

7. The method of claim 1, wherein the statistical analysis of the vector of weights comprises performing a logistic regression on the vector of weights.

8. The method of claim 1, wherein the statistical analysis of the vector of weights comprises inputting the vector of weights to a machine learning model.

9. The method of claim 8, wherein the machine learning model is selected from the group consisting of generalized linear models, ordinary least squares, ridge regression, lasso, multi-task lasso, elastic net, multi-task elastic net, least angle regression, LARS lasso, orthogonal matching pursuit, Bayesian regression, naive Bayesian, logistic regression, stochastic gradient descent, neural networks, Perceptron, passive aggressive algorithms, robustness regression, Huber regression, polynomial regression, linear and quadratic discriminant analysis, kernel ridge regression, support vector machines, stochastic gradient descent, nearest neighbor, Gaussian processes, cross-decomposition, decision trees, random forest, and ensemble methods.

10. The method of claim 1, wherein n is at least two.

11. The method of claim 1, wherein the corrective action is selected from the group consisting of quarantining the file, stopping execution of the file, notifying the user that the file likely is malicious, flagging the file, storing the file, generating a hash of the file, transmitting the file or a hash of the file, and reverting to an earlier version of the file or device software.

12. A system for protecting a device from a malicious file, the system comprising:
a data processor; and
memory storing instructions which, when executed by the data processor, result in operations comprising:
identifying one or more suitable sections associated with the file for analysis based on characteristic codes therein, the file being a portable executable (PE) file, the suitable sections comprising at least one of: an entry point function of the PE file or a Nullsoft scriptable install system (NSIS) associated with the PE file;
extracting from the one or more suitable sections of the file sequential data comprising discrete tokens;
generating n-grams of the discrete tokens, the discrete tokens being JAVASCRIPT tokens;
generating, using a bag of words algorithm, a vector of weights based on respective frequencies of the n-grams;
based on a statistical analysis of the vector of weights, determining that the file is likely to be malicious; and
initiating, responsive to determining that the file is likely to be malicious, a corrective action.

13. The system of claim 12, wherein the extracted sequential data comprises operation code.

14. The system of claim 13, wherein the discrete tokens respectively comprise syllables of machine language instructions within the operation code.

15. The system of claim 12, wherein generating the vector of weights comprises:
determining a term frequency of each of the n-grams among the other n-grams.

16. The system of claim 15, wherein generating the vector of weights further comprises:
determining an inverse document frequency of each of the n-grams within a corpus.

17. The system of claim 16, wherein generating the vector of weights further comprises:
generating a dot product of the term frequency and the inverse document frequency for each of the n-grams.

18. The system of claim 12, wherein the statistical analysis of the vector of weights comprises performing a logistic regression on the vector of weights.

19. The system of claim 12, wherein the statistical analysis of the vector of weights comprises inputting the vector of weights to a machine learning model.

20. The system of claim 19, wherein the machine learning model is selected from the group consisting of generalized linear models, ordinary least squares, ridge regression, lasso, multi-task lasso, elastic net, multi-task elastic net, least angle regression, LARS lasso, orthogonal matching pursuit, Bayesian regression, naive Bayesian, logistic regression, stochastic gradient descent, neural networks, Perceptron, passive aggressive algorithms, robustness regression, Huber regression, polynomial regression, linear and quadratic discriminant analysis, kernel ridge regression, support vector machines, stochastic gradient descent, nearest neighbor, Gaussian processes, cross-decomposition, decision trees, random forest, and ensemble methods.

21. The system of claim 12, wherein n is at least two.

22. The system of claim 12, wherein the corrective action is selected from the group consisting of quarantining the file, stopping execution of the file, notifying the user that the file likely is malicious, flagging the file, storing the file, generating a hash of the file, transmitting the file or a hash of the file, and reverting to an earlier version of the file or device software.

23. A non-transitory computer program product storing instructions which, when executed by a data processor forming part of a computing device, result in operations comprising:
- identifying one or more suitable sections associated with a file for analysis based on characteristic codes therein, the file being a portable executable (PE) file, the suitable sections comprising at least an entry point function of the PE file or a Nullsoft scriptable install system (NSIS) associated with the PE file;
- extracting from the one or more suitable sections of the file sequential data comprising delimited discrete tokens, the discrete tokens being C++ tokens;
- generating n-grams of the discrete tokens, the n-grams of the discrete tokens comprising a plurality of sequences of the discrete tokens, each of the sequences including up to n of the discrete tokens in an order in which the discrete tokens occur in the file, each of the n-grams being unique;
- generating, using a bag of words algorithm, a vector of weights based on respective frequencies of the n-grams;
- based on a statistical analysis of the vector of weights, determining that the file is likely to be malicious; and
- responsive to determining that the file is likely to be malicious, initiating a corrective action.

* * * * *